United States Patent [19]

DeSaw

[11] 4,133,469
[45] Jan. 9, 1979

[54] FURNISHING WELD MATERIAL
[75] Inventor: Fred A. DeSaw, Columbus, Ohio
[73] Assignee: Cooper Industries, Inc., Houston, Tex.
[21] Appl. No.: 794,886
[22] Filed: May 9, 1977
[51] Int. Cl.$^2$ .............................................. B23K 9/12
[52] U.S. Cl. ........................................ 228/7; 228/41; 219/124.02; 219/124.31
[58] Field of Search ................. 228/7, 41; 219/125 R, 219/125 PL

[56] References Cited
U.S. PATENT DOCUMENTS

| | | | |
|---|---|---|---|
| 3,288,980 | 11/1966 | Rohrberg et al. | 219/125 R |
| 3,544,758 | 12/1970 | Dal Molin | 219/74 X |
| 3,803,381 | 4/1974 | Bernard et al. | 219/74 X |
| 3,859,495 | 1/1975 | Takahashi et al. | 219/125 R |

Primary Examiner—Al Lawrence Smith
Assistant Examiner—K. J. Ramsey
Attorney, Agent, or Firm—Philip M. Dunson; Barry S. Bissell; Vincent L. Barker, Jr.

[57] ABSTRACT

Apparatus for furnishing weld material to a surface for welding thereto along a predetermined welding path, comprising an elongate guide (such as a tube) having a contacting surface (typically internal) substantially uniform in cross section and defining a longitudinal guide path (as by a slot opening) corresponding to the welding path, means for maintaining the guide in a position with the guide path adjacent to the surface to be welded and in registry with the welding path, weld material supply means in controlled contact with the guide (as inside the tube) and comprising an elongate flexible member having a contacting surface with its cross section (typically external) shaped to fit slidably in a predetermined position alongside the contacting surface of the guide (as inside the tube), a longitudinal opening through the elongate flexible member, and an elongate piece of flexible weld material (such as a wire) slidably positioned in and protruding from the opening, means for moving the weld material supplying means along the guide (as through the tube), typically by pulling at a substantially constant speed, and means for positioning the protruding end of the piece of weld material substantially at a predetermined distance and attitude adjacent to a location on the welding path and feeding the weld material in such manner as to provide a desired weld bead along the welding path as the supplying means is moved along the guide.

7 Claims, 5 Drawing Figures

FURNISHING WELD MATERIAL

BACKGROUND

Automatic welding equipment is being used more and more, where feasible, to replace manual welding. Where space permits, virtually any desired extent of automation can be provided. Where space is limited, however, conventional automatic welding equipment sometimes cannot be fit into the small available spaces in such manner as would be required to provide effective welding at all of the places where it is needed. So it has been necessary to resort to manual welding at such places.

The present invention comprises simple, compact, versatile apparatus for use in welding in places that would not be accessible to conventional or other known automatic welding systems. It can be used in welding not only along simple paths but also along curved, irregularly shaped paths, such as three dimensional ones. Advantageous use of the present invention has been demonstrated by employing apparatus of the type disclosed herein to weld such things as the internal joints of impeller blades, where space is severely limited and the angle at which the joint is welded must be varied as the angle between the blade and the hub to which it is to be welded changes. The typical embodiment disclosed herein, for use in a gas-shielded metal arc welding system that may be at least largely automatic, is an especially useful one. However, the invention may be used for furnishing weld material to a surface for welding thereto along a predetermined welding path by means other than arc welding and using other weld materials besides metals, such as plastics.

SUMMARY

Typical apparatus according to the present invention for furnishing weld material to a surface for welding thereto along a predetermined welding path comprises an elongate guide having a contacting surface substantially uniform in cross section and defining a longitudinal guide path corresponding to the welding path, means for maintaining the guide in a position with the guide path adjacent to the surface to be welded and in registry with the welding path, weld material supplying means in controlled contact with the guide and comprising an elongate flexible member having a contacting surface with its cross section shaped to fit slidably in a predetermined position alongside the contacting surface of the guide, a longitudinal opening through the elongate flexible member, and an elongate piece of flexible weld material slidably positioned in and protruding from the opening, means for moving the weld material supplying means along the guide, and means for positioning the protruding end of the piece of weld material substantially at a predetermined distance and attitude adjacent to a location on the welding path and feeding the weld material in such manner as to provide a desired weld bead along the welding path as the supplying means is moved along the guide.

The positioning and feeding means typically includes means for keeping the protruding end of the piece of weld material positioned substantially at the predetermined distance adjacent to the welding path as the supplying means is moved along the guide. Alternatively it may include means for controlling the position of the protruding end of the piece of weld material to provide substantially the optimum distances and attitudes along the welding path as the supplying means is moved along the guide.

The guide typically comprises an elongate enclosure having a substantially uniform transverse internal cross section and a substantially uniform longitudinal slot opening corresponding to the welding path, the guide position maintaining means typically holds the enclosure in a position with the slot opening adjacent to the surface to be welded and in registry with the welding path, the weld material supplying means typically is held slidably in the enclosure and comprises an elongate flexible member having at its welding end a short portion with an external cross section shaped to fit slidably in a predetermined position within the enclosure, and the moving means typically moves the weld material supplying means longitudinally through the enclosure.

The weld material end positioning and feeding means typically comprises a contact tube held at a fixed position in the short welding end portion of the weld material supplying means and forming an extension of the longitudinal opening through the elongate flexible member, with the end of the weld material protruding therefrom and thereby directed at the predetermined attitude toward the slot opening in the enclosure, and means for feeding and heating the weld material in such manner as to provide a desired weld bead along the welding path.

The moving means typically comprises means for driving a portion of the weld material supplying means located away from the welding end and beyond the end of the welding path at a substantially constant speed and thus moving the protruding end of the weld material along the welding path at the same substantially constant speed.

The short welding end portion of the weld material supplying means typically comprises an outward extension that fits closely but slidably in the longitudinal slot opening in the closure, and typically comprises a material having high heat conductivity.

DRAWINGS

DETAILS

Figure 1:
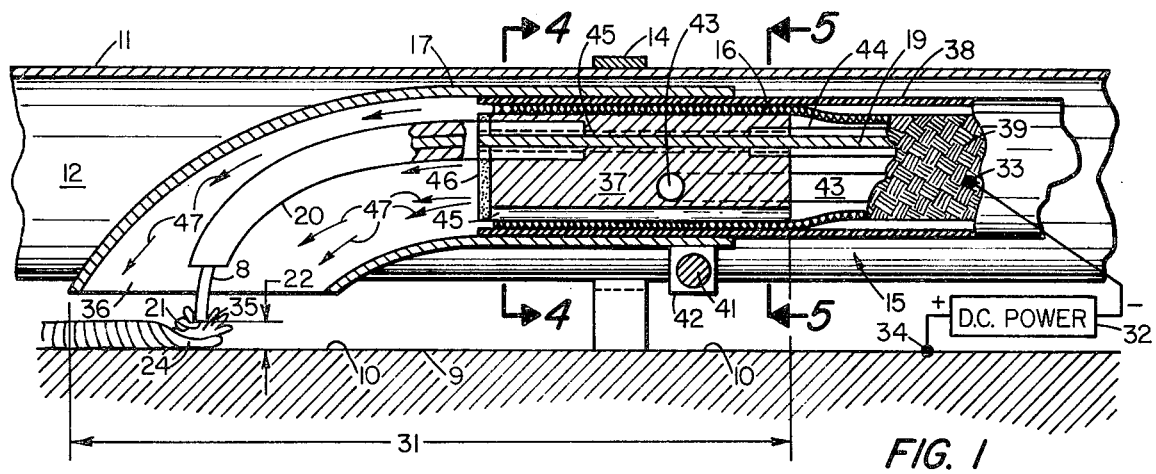
FIG. 1 is a longitudinal sectional view of a portion of the apparatus comprising a typical embodiment of the present invention.
Figure 2:
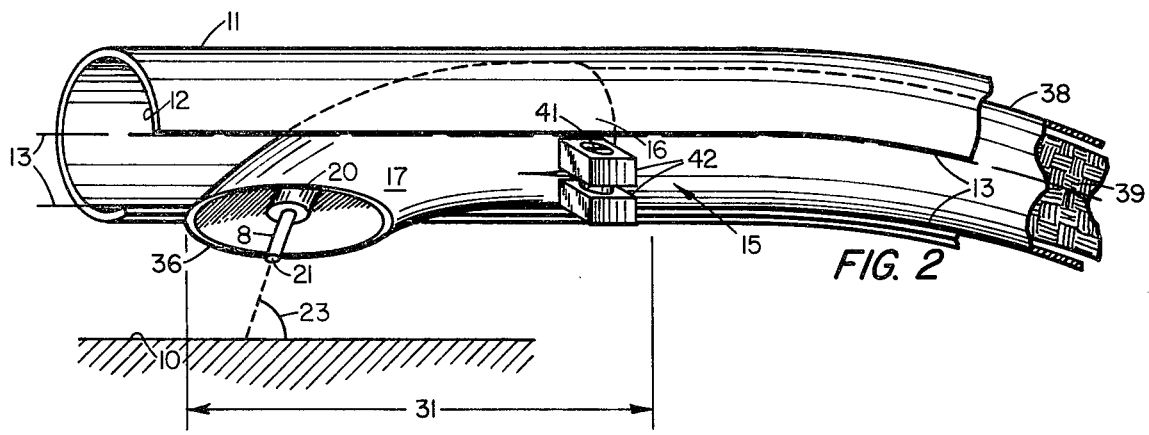
FIG. 2 is a perspective view of typical apparatus as in FIG. 1.
Figure 3:
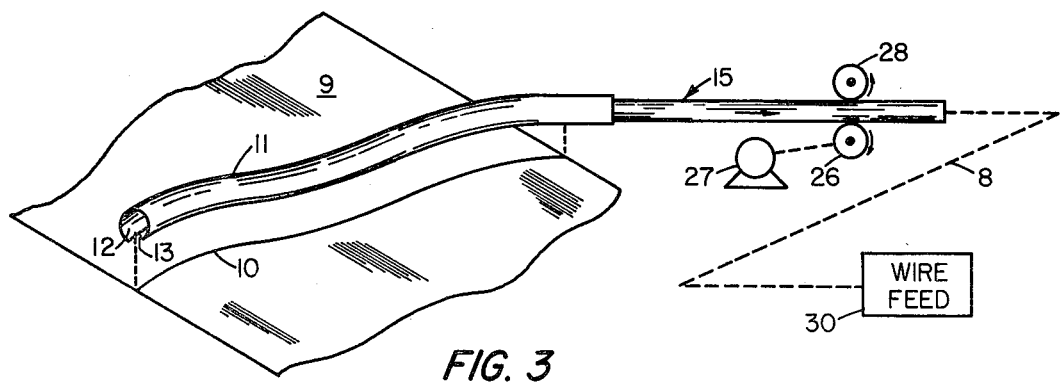
FIG. 3 is a simplified perspective view, partially exploded for clarity, illustrating a typical embodiment of the present invention.
Figure 4:
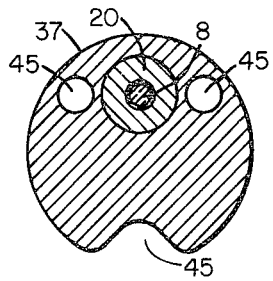
FIG. 4 is a sectional view taken in the plane 4—4 of FIG. 1.
Figure 5:
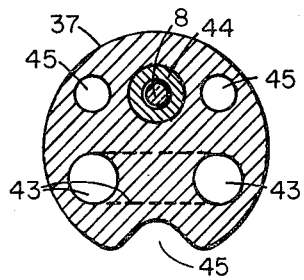
FIG. 5 is a sectional view taken in the plane 5—5 of FIG. 1.

Referring to FIGS. 1-3, typical apparatus according to the present invention for furnishing weld material 8, typically metal wire, to a surface 9 for welding thereto along a predetermined welding path 10 comprises an elongate guide 11 having a contacting surface 12 substantially uniform in cross section and defining a longitudinal guide path 13 corresponding to the welding path 10, means 14 for maintaining the guide 11 in a position with the guide path 13 adjacent to the surface 9 to be welded and in registry with the welding path 10, weld material supplying means 15 in controlled contact with the guide 11 and comprising an elongate flexible member 16 having a contacting surface 17 with its cross section shaped to fit slidably in a predetermined position alongside the contacting surface 12 of the guide 11, a longitudinal opening 19 through the elongate flexible member 16, and an elongated piece of flexible weld material 8 slidably positioned in and protruding from the opening 19, at the end of a contact tube 20, means, such as a drive roller 26 driven by a motor 27 and pressing against an idler roller 28, for moving the weld material supplying means 15 along the guide 11, and means, typically including the contact tube 20 and a wire feed apparatus shown schematically at 30, for positioning the protruding end 21 of the piece of weld material 8 substantially at a predetermined distance 22 and attitude (as at 23) adjacent to a location on the welding path 10 and feeding the weld material 8 in such manner as to provide a desired weld bead 24 along the welding path 10 as the supplying means 15 is moved along the guide 11.

Typically the positioning and feeding means 20, 30 includes means such as a wire feed device 30 for keeping the protruding end 21 of the piece of weld material 8 positioned substantially at the predetermined distance 22 adjacent to the welding path 10 as the supplying means 15 is moved along the guide 11. Where the optimum distance 22 or the optimum attitude 23, or both, may change along the welding path 10, however, (as in welding a joint between an impeller blade and a hub where the angle between them varies along the joint) the positioning and feeding means typically includes means 20, 30 for controlling the position of the protruding end 21 of the piece of weld material 8 to provide substantially the optimum distances 22 and attitudes 23 along the welding path 10 as the weld material supplying means 15 is moved along the guide 11. In such a case, the wire feed 30 may comprise known automatic feed control means, typically either programmed or servo controlled, for providing substantially the optimum distances 22; and the enclosure tube 11 is positioned and held, as at 14, with its guide slot 13 so located as to direct the protruding end 21 of the wire 8 in substantially the optimum attitudes 23; as the welding progresses along the welding path 10.

The guide 11 typically comprises an elongate enclosure, such as a tube 11, having a substantially uniform transverse internal cross section along the inner surface 12 and a substantially uniform longitudinal slot opening 13 corresponding to the welding path 10, the guide position maintaining means indicated schematically at 14 typically holds the enclosure 11 (by providing forces to exert a clamping action or other convenient physical restraint to prevent movement of the enclosure) in a position with the slot opening 13 adjacent to the surface 9 to be welded and in registry with the welding path 10, the weld material supplying means 15 typically is held slidably in the enclosure 11 and comprises an elongate flexible member 16 having at its welding end a short portion 31 with an external cross section along the surface 17 shaped to fit slidably in a predetermined position within the enclosure 11, and the moving means 26 typically moves the weld material supplying means 15 longitudinally through the enclosure 11. While the elongate member 16, as a whole, is flexible; the short welding end portion 31, in itself, need not be flexible.

The weld material end positioning and feeding means typically comprises a contact tube 20 held at a fixed position in the short welding end portion 31 of the weld material supplying means 15 and forming an extension of the longitudinal opening 19 through the elongate flexible member 16, with the end 21 of the weld material 8 protruding therefrom and thereby directed at the predetermined attitude 23 toward the slot opening 13 in the enclosure 11, and means for feeding, as at 30, and heating the weld material (typically by supplying direct current, as indicated schematically at 32, 33, 34, to provide an electric arc at 35) in such manner as to provide a desired weld bead 24 along the welding path 10.

In FIG. 3, the motor 27 typically is a constant speed motor, and the moving means thus typically comprises means 26, 27, 28 for driving a portion of the weld material supplying means 15 located away from the welding end 31 and beyond the end of the welding path 10 at a substantially constant speed and thus moving the protruding end 21 of the weld material 8 along the welding path 10 at the same substantially constant speed.

In FIGS. 1 and 2, the short welding end portion 31 of the weld material supplying means 15 typically comprises an outward extension 36 that fits closely but slidably in the longitudinal slot opening 13 in the enclosure 11, and typically comprises a material having high heat conductivity, such as copper, not only in the extension 36 (which serves also as a gas shielding cup), but also in the head block 37, where much of the heat from the arc 35 is dissipated.

In a typical embodiment of the present invention for arc welding, the gas shield cup 36 provides for the correct gas coverage of the molten weld puddle 24, maintains the welding end portion 31 of the torch 15 in alignment in the slot 13 of the guide tube 11, and locks the polytetrafluoroeoethylene or other slick plastic insulator and gas tube 38 and the braided copper conductor 39 to the copper head block 37 by means of the socket head cap screw 41 in the guide block tabs 42 protruding into the guide slot 13 and fitting slidably, and a bit loosely, therein.

The nylon or other plastic water cooling lines 43 and wire insulating and guide tube 44, as well as the braided copper conductor 39 and the gas tube 38, provide the flexibility required for this torch 15 and yet withstand the heat of the welding environment. The slick surfaced gas tube 38 provides smooth movement of the torch 15 in the guide tube 11, because of its low coefficient of friction. This is important since weld quality depends on a smooth travel speed with no sudden or jerky movements.

The relatively short copper head block 37 serves as a heat exchanger, acts as a terminal point for the long flexible part of the torch 15, holds the contact tube 20 in position, and provides a rigid member for the gas shield cup and guide 36. Because it is short and fits a bit loosely in the tube 11 and the slot 13 at the tab end 42, the head block 37 allows the torch 15 to traverse curves of short radii in the guide tube 11.

Inert gas 47 is supplied under pressure through the insulator and gas tube 38 and proceeds through the gas passages 45 in the head block 37 and a porous disk gas diffuser 46 to the gas shielding cup 36, where it shields the arc 35 from any ambient atmosphere, liquid, or other foreign matter. The size and shape of the shielding cup 36 are important in providing satisfactory coverage by the shielding gas 47. An oval opening as is shown in FIG. 2, with the major axis of the opening parallel to the guide slot 13 and the weld axis 10, is preferred. The length of the contact tube 20 is selected to position the arc in the center of the gas shield 36. If the arc is positioned too far forward or back from the center position, the weld may be porous. The gas diffuser disk 46, typically made from copper mesh, assists in providing uniform flow of the gas 47 through the cup 36. Without this disk 46, the gas 47 tends to stream and not to provide uniform coverage.

Welders as shown in FIGS. 1-5 where designed and used effectively to weld in heretofore inaccessible regions such as the long low openings found in impellers and in sandwich type structures where long vertical members are welded between closely spaced plate having substantially large surface areas, as are common in the aerospace industry.

Presently there is no known way to arc weld curved or straight blades or vertical ribs between two horizontal plates which are spaced about a half inch or less apart without a lot of manual shielded metal arc welding, and then many times some inaccessible areas must be left unwelded. Where the vertical members are long, the only known way to arc weld them is to cut slots in the plates where the vertical members are to be welded and to weld in the slots from the outside. Welders according to the present invention can weld between any two surfaces as close as ⅜ to ½ inch. All that is required is that the guide tube 11 can be positioned and held in alignment with the joint or weld path 10. The guide tube 11 can be bent to follow a three-dimensional welding path 10. After the guide tube 11 is bent to shape, the slot 13 to accommodate the torch gas cup 36 is cut. Any bending of the tube 11 must be done before the slot 13 is cut. If the tube 11 is bent after the slot 13 is cut, the tube 11 may buckle.

While the forms of the invention herein disclosed constitute presently preferred embodiments, many others are possible. It is not intended herein to mention all of the possible equivalent forms or ramificiations of the invention. It is to be understood that the terms used herein are merely descriptive rather than limiting, and that various changes may be made without departing from the spirit or scope of the invention.

I claim:

1. Apparatus for furnishing weld material to a surface for welding thereto along a predetermined welding path, comprising
   - an elongate guide having a contacting surface substantially uniform in cross section and defining a longitudinal guide path corresponding to the welding path,
   - means for maintaining the guide in a position with the guide path adjacent to the surface to be welded and in registry with the welding path,
   - weld material supplying means in controlled contact with the guide and comprising an elongate flexible member having a contacting surface with its cross section shaped to fit slidably in a predetermined position alongside the contacting surface of the guide, a longitudinal opening through the elongate flexible member, and an elongate piece of flexible weld material slidably positioned in and protruding from the opening,
   - means for moving the weld material supplying means along the guide, and
   - means for positioning the protruding end of the piece of weld material substantially at a predetermined distance and attitude adjacent to a location on the welding path and feeding the weld material in such manner as to provide a desired weld bead along the welding path as the supplying means is moved along the guide; and wherein
   - the guide comprises an elongate enclosure having a substantially uniform transverse internal cross section and a substantially uniform longitudinal slot opening corresponding to the welding path,
   - the guide position maintaining means holds the enclosure in a position with the slot opening adjacent to the surface to be welded and in registry with the welding path,
   - the weld material supplying means is held slidably in the enclosure and comprises an elongate flexible member partly enclosed by the guide enclosure and having at its welding end a short portion with an external cross section shaped to fit slidably in a predetermined position within the enclosure, and
   - the moving means moves the weld material supplying means longitudinally through the enclosure.

2. Apparatus as in claim 1, wherein the positioning and feeding means includes means for keeping the protruding end of the piece of weld material positioned substantially at the predetermined distance adjacent to the welding path as the supplying means is moved along the guide.

3. Apparatus as in claim 1, wherein the positioning and feeding means includes means for controlling the position of the protruding end of the piece of weld material to provide substantially the optimum distances and attitudes along the welding path as the supplying means is moved along the guide.

4. Apparatus as in claim 1, wherein the weld material end positioning and feeding means comprises a contact tube held at a fixed position in the short welding end portion of the weld material supplying means and forming an extension of the longitudinal opening through the elongate flexible member, with the end of the weld material protruding therefrom and thereby directed at the predetermined attitude toward the slot opening in the enclosure, and means for feeding and heating the weld material in such manner as to provide a desired weld bead along the welding path.

5. Apparatus as in claim 1, wherein the moving means comprises means for driving a portion of the weld material supplying means located away from the welding end and beyond the end of the welding path at a substantially constant speed and thus moving the protruding end of the weld material along the welding path at the same substantially constant speed.

6. Apparatus as in claim 1, wherein the short welding end portion of the weld material supplying means comprises an outward extension that fits closely but slidably in the longitudinal slot opening in the enclosure.

7. Apparatus as in claim 1, wherein the short welding end portion of the weld material supplying means comprises a material having high heat conductivity.

* * * * *

UNITED STATES PATENT OFFICE
CERTIFICATE OF CORRECTION

Patent No. 4,133,469                     Dated January 9, 1979

Inventor(s)    Fred A. DeSaw

It is certified that error appears in the above-identified patent and that said Letters Patent are hereby corrected as shown below:

Claim 1, Col. 5, Line 43 - after "path" insert -- that may be curved, --

Col. 3, Line 4 - "elongated" should be -- elongate--

Signed and Sealed this

*Seventeenth* Day of *April 1979*

[SEAL]

*Attest:*

RUTH C. MASON
*Attesting Officer*

DONALD W. BANNER
*Commissioner of Patents and Trademarks*